Aug. 24, 1965　　　G. POITRAS　　　3,201,844
PIPE HEADER FOR FORMING GASKET GROOVES IN CONCRETE PIPE TONGUES
Filed Oct. 7, 1963　　　　　　　　3 Sheets-Sheet 1
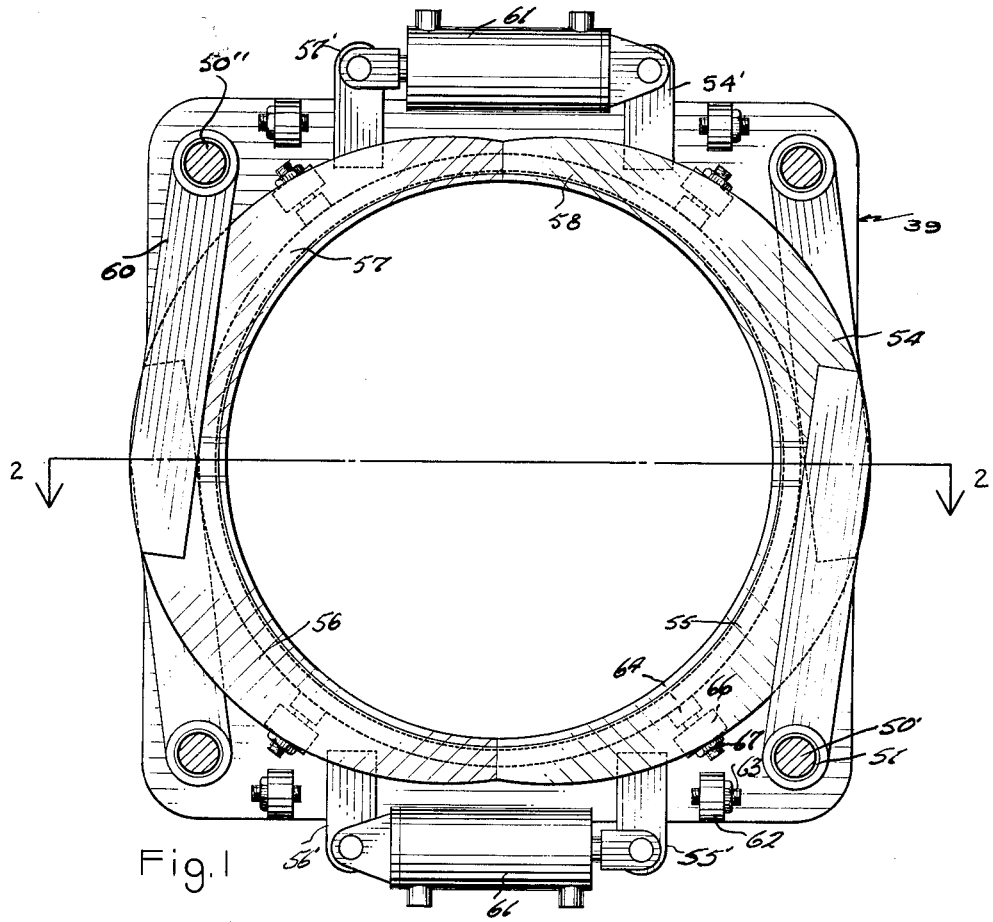

Aug. 24, 1965   G. POITRAS   3,201,844
PIPE HEADER FOR FORMING GASKET GROOVES IN CONCRETE PIPE TONGUES
Filed Oct. 7, 1963   3 Sheets-Sheet 2

INVENTOR
George Poitras
By Fletchertough Kent
HIS ATTYS

Aug. 24, 1965 G. POITRAS 3,201,844
PIPE HEADER FOR FORMING GASKET GROOVES IN CONCRETE PIPE TONGUES
Filed Oct. 7, 1963 3 Sheets-Sheet 3

INVENTOR
GEORGE POITRAS
HIS ATTY.

United States Patent Office 3,201,844
Patented Aug. 24, 1965

3,201,844
PIPE HEADER FOR FORMING GASKET GROOVES IN CONCRETE PIPE TONGUES
George Poitras, 1010 Elizabeth Road, St. Boniface 6, Manitoba, Canada
Filed Oct. 7, 1963, Ser. No. 314,356
Claims priority, application Great Britain, Oct. 16, 1962, 39,069/62
7 Claims. (Cl. 25—39)

My invention relates to new and useful improvements in concrete pipe headers designed to form the gasket groove in the tongue end or spigot of concrete pipes.

Conventional concrete sewer pipe is connected by a tongue and groove design or what might be termed a male and female spigot design wherein a length of pipe of a reduced diameter is formed on one end and an expanded bell spigot is formed on the opposite end, adapted to receive the reduced end when two lengths of pipe are adjacently connected together.

Present day developments of such concrete sewer pipe incorporate a flexible gasket recessed within a circumferentially formed groove on the reduced diameter end which, when forced into engagement within the expanded bell spigot of an adjacent length of pipe, gives adequate seal.

This means that a groove has to be provided in the tongue or reduced shoulder end of the pipe to hold the gasket securely in position and this groove is normally formed during the process of manufacture of the tongue.

Conventionally a ring is secured to the interior surface of the header mould, said ring being split and being manufactured from steel, aluminum or other metal and this ring is retained in position under its own tension.

After the concrete pipe has been formed on the conventional machine and moved to a place for curing, the mould is stripped from the formed pipe. The head portion, however, remains on the pipe first to retain the roundness of the pipe until such time as the concrete pipe has gained sufficient strength through curing to retain its own shape and secondly to retain dimensional stability to the groove in the tongue so that it will receive the gasket and form the proper connection between an adjacent length of pipe.

In order to strip the header from the pipe, the header is pulled upwardly but if the pipe is not sufficiently cured or concrete sticks to the inside wall of the header, the ring which is under tension, cannot slide inside the header while it is being pulled upwardly so that the top portion of the pipe is fractured or damaged thus causing considerable loss in production.

In order to limit the loss in pipe production, the pipes have to be cured to almost full strength before the headers are stripped and this, of course, means that the manufacturer has to have a relatively large number of headers which remain on the pipes during curing thus they cannot be used for pipe production immediately.

This means, of course, that the total amount of headers required for a relatively high pipe production represents a high investment cost.

I have overcome these disadvantages by providing a header having a groove forming component which is expandable so that it clears the concrete pipe during the withdrawal of the header, and retractable when in position so that the groove can be formed around the component.

This not only results in the reduction of spoiled or damaged pipes but also releases the headers for reuse as soon as the concrete is set up sufficiently to maintain its shape and dimensions.

The principal object and essence of my invention is therefore to provide a device of the character herewithin described which includes an expandable and retractable groove forming component incorporated within the header mould construction.

Another object of my invention is to provide a device of the character herewithin described which reduces the number of damaged pipes in production.

Still another object of my invention is to provide a device of the character herewithin described which provides means to limit the amount of expansion and contraction of the groove forming component for efficient operation.

A still further object of my invention is to provide a device of the character herewithin described which can be operated manually, pneumatically or hydraulically as desired.

A still further object of my invention is to provide a device of the character herewithin described which is simple in construction, economical in manufacture, and otherwise well suited to the purpose for which it is designed.

With the foregoing objects in view, and such other objects and advantages as will become apparent to those skilled in the art to which this inventtion relates as this specification proceeds, my invention consists essentially in the arrangement and construction of parts all as hereinafter more particularly described, reference being had to the accompanying drawings in which:

FIGURE 1 is a top plan view of the preferred embodiment of my device with the upper plate removed for clarity and showing the device in the groove forming or retracted position.

FIGURE 2 is a sectional view substantially along the line 2—2 of FIGURE 1 but with the upper plate in position.

FIGURE 3 is a side elevation of FIGURE 1.

In the drawings like characters of reference indicate corresponding parts in the different figures.

Figure 8:
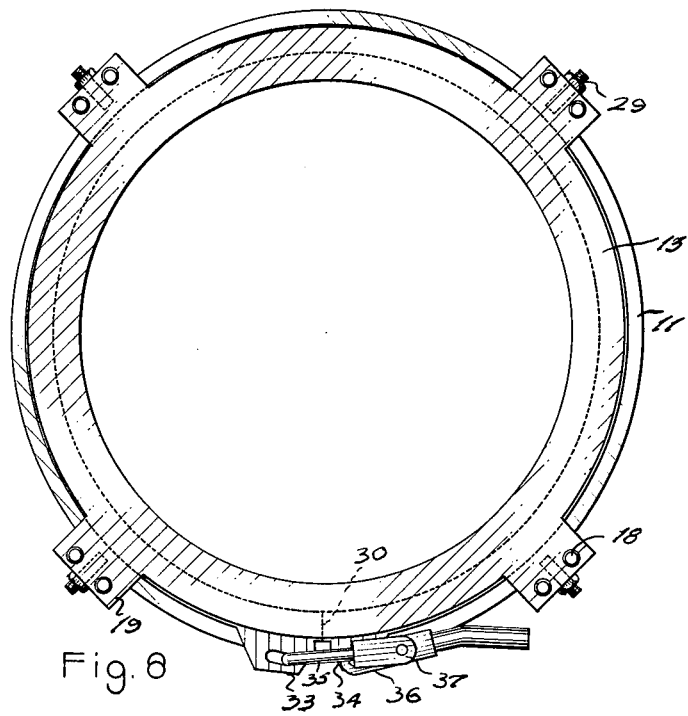
FIGURE 8 is a top plan view of an alternative embodiment of my device, with the groove forming component in the closed or forming position.
Figure 9:
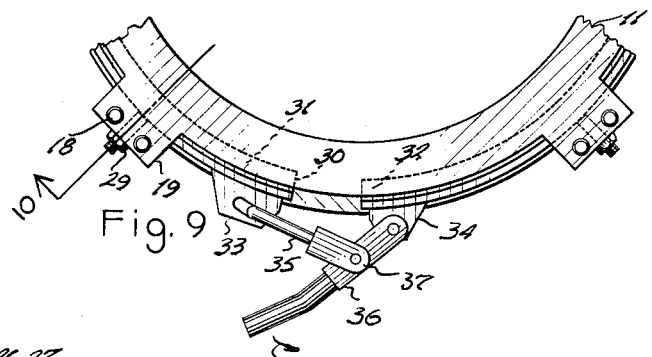
FIGURE 9 is a fragmentary view similar to FIGURE 8 but with the groove forming component shown in the open position.
Figure 10:
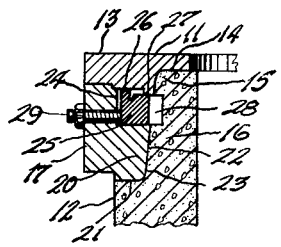
FIGURE 10 is a fragmentary sectional view indicated by the arrow 10 in FIGURE 9.

Proceeding first to describe the embodiment illustrated in FIGURES 8, 9 and 10, reference should be made to the accompanying drawings in which a ring mould or header 11 is shown adapted to engage the upper end of a conventional pipe mould (not illustrated) but extending around the upper end of the pipe 12 to be formed therein.

This ring mould comprises an upper annular ring 13 having a right angularly curved inner surface 14 which acts as the mould for the upper end 15 of the pipe spigot or tongue 16.

A lower annular ring 17 is secured to the upper ring by means of a plurality of bolts 18 extending through offstanding lugs 19 formed around the periphery of both the upper and lower plates.

The inner surface 20 of the lower plate is formed with a horizontal surface 21 and an upwardly and inwardly inclining surface 22 thus forming the lower end 23 of the spigot or tongue 16 of the pipe as clearly illustrated in FIGURE 10.

An annular recess 24 is formed within the lower plate 17 as illustrated in FIGURE 10, said recess being adapted to receive a groove forming component 25.

This groove forming component is resilient and normally is biased outwardly in much the same way as a piston ring and is provided with an annular upper shoulder 26 which is adapted to engage a downwardly extending annular shoulder 27 upon the upper plate 11 as shown in FIGURE 10 and these shoulders 26 and 27 limit the inward movement of the ring 25 thus controlling accurately the depth of the groove formed thereby 28 within the tongue or spigot end 16 of the concrete pipe.

The outward movement or expanded position of this ring is controlled by a plurality of adjustable set screws and nuts 29 engaging through the lower plate 17 as clearly shown in FIGURE 10 and engaging the outer surface of the ring 25.

Reference to FIGURES 8 and 9 will show that this ring is split as at 30 and that the adjacent ends 31 and 32 of this ring or component 25 are provided with offstanding lugs 33 and 34. A simple over center lever system is provided comprising a link 35 engageable by one end to the lug 33 and an operating lever 36 engageable by one end to the lug 34. The other end 37 of the link 35 is pivotally connected intermediate the ends of the lever 36 as clearly shown.

When in the position shown in FIGURE 9, the inherent resiliency of the ring or component 25 urges same outwardly to the position shown in FIGURE 10 against the stops or studs 29 so that the header component can be lifted clear of formed spigot or tongue without the ring in any way fouling the upper portion of the groove 28.

When it is desired to form the pipe and groove however, the handle 36 is moved in the direction of arrow 38 so that it takes up the position shown in FIGURE 8 which urges the ring into the groove forming position within the header mould so that the concrete pipe can be formed in the conventional manner with the components 25 acting as a mould for the groove 28.

The preferred embodiment of my invention is shown in FIGURES 1 to 7 inclusive and includes a ring component or header mould collectively designated 39 which consists of an upper annular plate 40, a lower annular plate 41, and a groove forming component collectively designated 42.

The upper annular plate is centrally apertured as at 43 to allow ingress of the concrete and forming tool in the conventional manner, said upper plate including the horizontal portion 44 and the down turned annular flange portion 45 formed on the underside of this plate, said flange acting as a mould for the upper portion 46 of the tongue or spigot end 47 of the concrete pipe being formed by the machine.

The lower plate 41 includes a horizontal circular flange 48 with an upstanding vertical annular flange 49 formed thereon, said flange 49 acting as a mould for the lower portion 50 of the spigot end 47 of the concrete pipe.

These two plates are maintained in spaced and parallel relationship by the provision of a plurality of pivot pins 50' surrounded by bushings 51, the further purpose of which will hereinafter be described.

Figure 5:
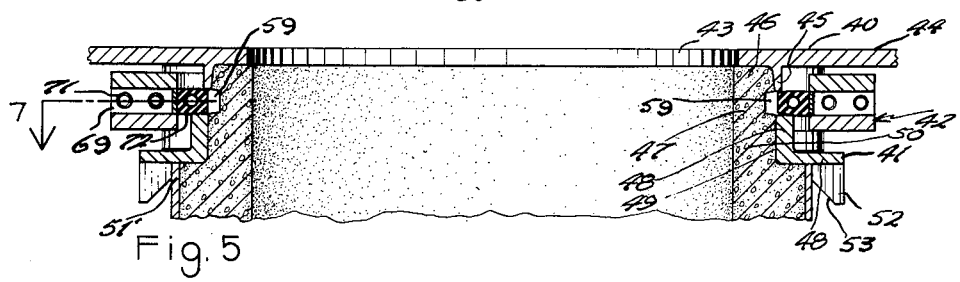
FIGURE 5 is a sectional view substantially along the line 5—5 of FIGURE 4.

The entire header assembly 39 is adapted to engage the upper end 51' of the conventional pipe mould as shown in FIGURES 2 and 5 and means 52 are provided around the periphery of the lower plate 41 adapted to center the header assembly over the pipe mould 51'. These components 52 are lugs extending downwardly at intervals from the horizontal flange 48 of the lower plate 41 with the inner surfaces 53 inclining upwardly and inwardly to engage over the upper end 51' of the pipe thus automatically centering the header assembly over its mould.

The groove forming component 42 consists of four segments 54, 55, 56 and 57 situated between the plates 40 and 41 and having inner surfaces 58 acting as the inner edge of the component forming the gasket groove 59 within the spigot end of the pipe.

These segments are situated in which I define as opposed pairs, segments 55 and 54 forming one pair and segments 56 and 57 forming the other pair.

Each segment is mounted between the plates by the provision of an off standing arm 60 secured to each segment and extending to a pivot pin 50' in an adjacent quadrant of the header.

Figure 4:
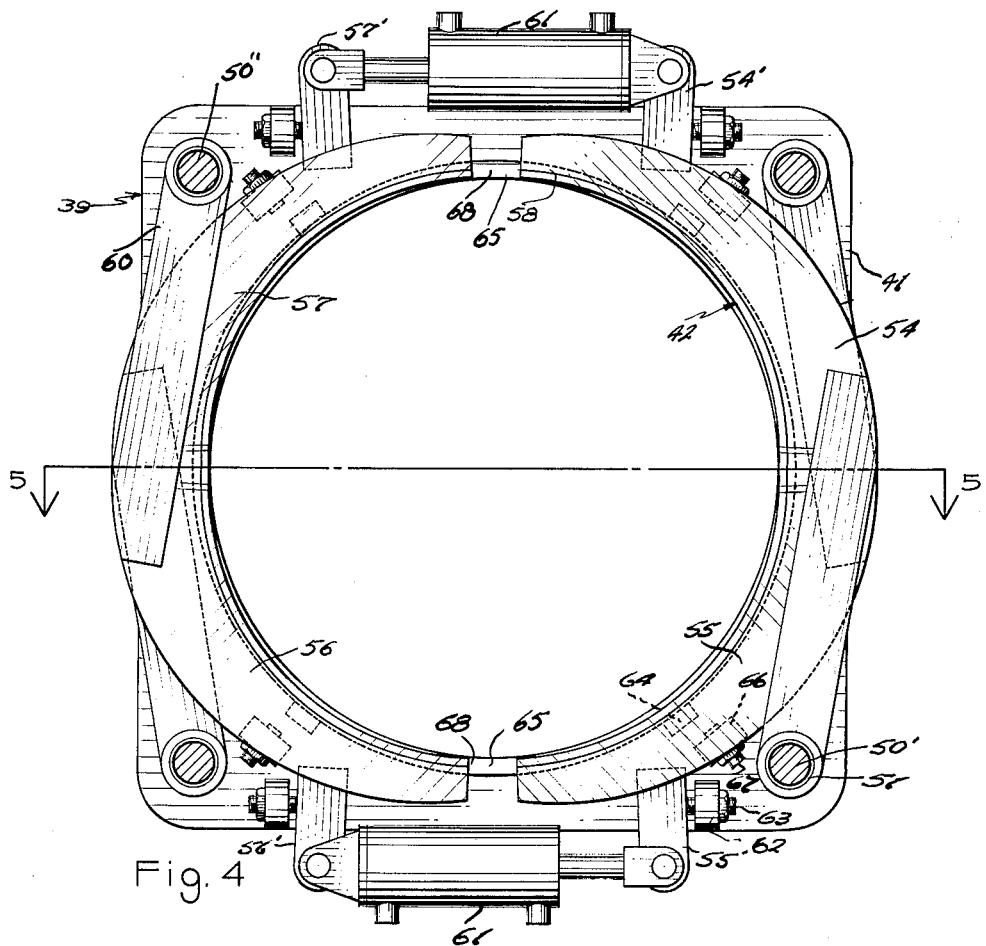
FIGURE 4 is a view similar to FIGURE 1 but showing the groove forming component in the open or expanded position.

This arrangement is clearly shown in FIGURES 1 and 4 and as an example, the pivot pin specifically designated 50" carries the arm 60 which extends from segment 56 which is in the adjacent quadrant of the header assembly, it being understood that the term "quadrant" refers to the plan views of the drawings shown in FIGURES 1 and 4.

Each segment also is provided with an offstanding lug 54', 55', 56' and 57' and reference to the drawings will show that the lugs of adjacent segments of opposed pairs are situated substantially in spaced and parallel relationship one with the other, namely lugs 55' and 56' and lugs 54' and 57'.

These pairs of lugs are linked by means of an hydraulic or pneumatic piston and cylinder assembly 61 adapted to expand or contract the segments to which they are attached.

It is to be appreciated that these piston and cylinder assemblies 61 are connected to a conventional source of pneumatic or hydraulic power (not illustrated) and controlled by valves in the usual manner.

It is of course necessary to limit the outward movement of the segments and I have provided upstanding nut portions 62 secured to the lower plate through which engage lock nut and belt assemblies 63 which are conventional in construction.

It is also necessary to limit the inward movement of the segments and thus the depth of the groove formed thereby and in this connection I provide blocks 64 secured to the lower plate adjacent the inner edge 65 thereof and nut assemblies 66 upon the segments engageable by adjustable lock nut and bolt assemblies 67 and reference to FIGURE 4 will show the operation of the lugs engaging the limit stops 62 whereas FIGURE 1 shows the operation of the stop assemblies 66 engaging the blocks 64.

It should be noted that the aforementioned arms 60 are secured to the segments alternatively upon the upper surface and the lower surface thereof so that diagonally opposite segments 55 and 57 are provided with arms 60 secured to the upper surface thereof and diagonally opposite segments 54 and 56 are provided with arms secured to the under surface thereof. This is to provide clearance of the arms where they overlap one another across the center line as clearly shown.

When the piston and cylinder assemblies 61 are in the expanded position shown in FIGURES 4 and 5, it will be seen that gaps 68 are present between segments 57 and 54 and segments 56 and 55 but that when the segments are in the groove forming position as shown in FIGURE 1, these gaps are of course taken up by the contraction of the segments radially towards the center.

Figures 6, 7:
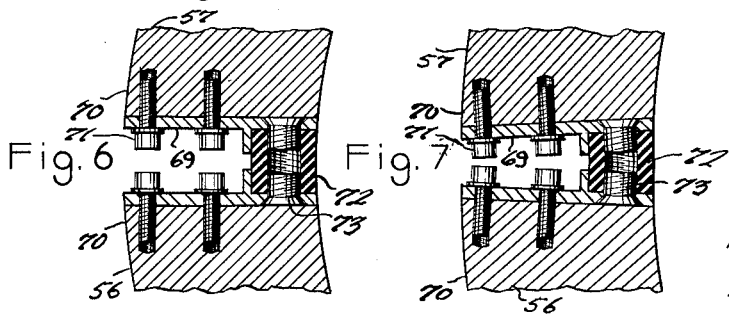
FIGURE 6 is a fragmentary sectional view along the line indicated by the arrow 6 in FIGURE 2.
FIGURE 7 is a view similar to FIGURE 6 but with the device taken along the line indicated by the arrow 7 in FIGURE 5.

It will also be appreciated that some device is required to span the gaps between segments 56 and 57 and between segments 54 and 55 and reference to FIGURES 6 and 7 should be noted as they show details of these devices.

A box-type channel member 69 is bolted to adjacent ends 70 of the segments by means of bolts 71, said box channel being adapted to receive a resilient bridging portion 72 preferably made of rubber or similar material and being secured within the channel or box section 69 by means of set screws 73.

Alternatively, these flexible bridging pieces can be bonded to the sides of the box channels 69 by conventional means thus eliminating the necessity of the set screws 73.

In operation, the device is seated upon the upper end of the pipe mould 51, being automatically centered by the lugs 52.

A source of compressed air or fluid is routed to the piston and cylinder assemblies 61 to contract the piston and cylinder assemblies so that the segments take up the position shown in FIGURES 1, 2, 3 and 6 thus contracting the groove forming component segments to the groove forming position.

This position is, of course, controlled by the adjustable stop assemblies 66 and the relevant blocks 64.

The pipe is then formed by the conventional roller head, concrete being forced around the interior of the header component and the protruding or retracted groove forming segments as clearly shown in FIGURE 2.

As soon as the pipe has cured sufficiently for self support, pneumatic or hydraulic pressure is applied to the piston and cylinder assemblies causing them to expand to the position shown in FIGURE 4. In this connection it will be appreciated that either the piston or cylinder will move first until the relevant lug 55' or 56' for example, engages the stop means 62 whereupon the opposite portion will expand to its full position thus ensuring that the segments expand radially and equally to the position shown in FIGURES 5 and 7. It will be appreciated that the segments are now expanded sufficiently to clear the groove walls completely so that the header can be pulled from the pipe without any danger of damage occuring by means of the segments jamming against the pipe wall.

This means that a minimum number of header assemblies are required and they can be put back into use just as soon as the pipe has cured sufficiently for self support.

Since various modificaitons can be made in my invention as hereinabove described, and many apparently widely different embodiments of same made within the spirit and scope of the claims without departing from such spirit and scope, it is intended that all matter contained in the accomapnying specifications shall be interpreted as illustartive only and not in a limiting sense.

What I claim as my invention is:

1. In a groove forming apparatus for concrete pipe tongues, the combination of a base ring and a top ring adapted to encircle a pipe tongue, a left-hand pair and a right-hand pair of posts connecting said base ring and said top ring together in spaced relation whereby to provide an annular space between said rings, a sectional groove forming component disposed between said rings and comprising a left-hand pair and a right-hand pair of quadrants radially projectable and retractable through said annular space between the rings, a left hand-pair and a right-hand pair of control arms rigidly connected to the respective quadrants in the respective pairs and pivotally mounted on the respective posts in the respective pairs, means movably connecting together adjacent ends of the quadrants in each pair, and fluid operated means reacting between the left-hand and right-hand pairs of quadrants for projecting and retracting the same through said annular space.

2. The apparatus as defined in claim 1 wherein said fluid operated means comprise a left-hand pair and a right-hand pair of lugs projecting laterally outwardly from the adjacent end portions of the respective quadrants in the resepctive pairs, and fluid operators reacting between the left-hand and the right-hand pairs of lugs.

3. The apparatus as defined in claim 2 together with adjustable stop means provided on one of said rings and coacting with said lugs to limit the extent of retraction of said quadrants.

4. The apparatus as defined in claim 1 together with adjustable stop means provided on said quadrants and coacting abutment means provided on one of said rings to limit the extent of projection of the quadrants.

5. The apparatus as defined in claim 1 wherein said means movably connecting together adjacent ends of the quadrants in each pair are resiliently flexible.

6. The apparatus as defined in claim 5 wherein said resiliently flexible means comprise resilient blocks interposed between and rigidly secured to the adjacent ends of the quadrants in each pair.

7. The apparatus as defined in claim 1 wherein said posts on which said control arms are pivotally mounted are located intermediate the circumferential span of said quadrants.

References Cited by the Examiner

UNITED STATES PATENTS

| | | | |
|---|---|---|---|
| 302,549 | 7/84 | Dorsett | 25—127 |
| 769,771 | 9/04 | Seamans | 25—121 |
| 3,114,956 | 12/63 | Gannaway | 25—39 |
| 3,124,857 | 3/64 | Delisle | 25—39 |

FOREIGN PATENTS 208,058  12/23  Great Britain.

WILLIAM J. STEPHENSON, *Primary Examiner.*

MICHAEL V. BRINDISI, *Examiner.*